(12) United States Patent
Sakamoto (10) Patent No.: US 7,175,349 B2
(45) Date of Patent: Feb. 13, 2007

(54) WHEEL ROTATION SUPPORTING APPARATUS

(75) Inventor: Junshi Sakamoto, Fujisawa (JP)

(73) Assignee: NSK Ltd., Tokyo (JP)

( * ) Notice: Subject to any disclaimer, the term of this patent is extended or adjusted under 35 U.S.C. 154(b) by 48 days.

(21) Appl. No.: 11/089,168

(22) Filed: Mar. 25, 2005

(65) Prior Publication Data

US 2005/0163410 A1 Jul. 28, 2005

(51) Int. Cl.
*F16C 35/06* (2006.01)

(52) U.S. Cl. ........................................ 384/544; 384/585

(58) Field of Classification Search ................ 384/539, 384/544, 589, 584, 585; 301/105.1
See application file for complete search history.

(56) References Cited

U.S. PATENT DOCUMENTS

| | | | | |
|---|---|---|---|---|
| 4,944,611 | A | * | 7/1990 | Ankenbauer et al. ....... 384/476 |
| 6,112,411 | A | * | 9/2000 | Rutter .......................... 384/539 |
| 6,170,919 | B1 | * | 1/2001 | Hofmann et al. .......... 301/105.1 |
| 6,485,188 | B1 | | 11/2002 | Dougherty |
| 6,866,422 | B2 | * | 3/2005 | Griseri et al. ............... 384/537 |
| 2003/0077016 | A1 | * | 4/2003 | Iarrera et al. ............... 384/537 |

FOREIGN PATENT DOCUMENTS

| JP | 2001-1709 | 1/2001 |
|---|---|---|
| JP | 2002-46409 | 2/2002 |

* cited by examiner

*Primary Examiner*—Thomas R. Hannon
(74) *Attorney, Agent, or Firm*—Crowell & Moring LLP (57) ABSTRACT

A cylindrical liner 29 made from steel is inserted into a knuckle 3b made from a light alloy, when casting the knuckle. Then, an outer ring 6b constituting a wheel bearing unit is internally secured to the inner diameter side of the liner 29. The finishing-process of double row outer ring raceways 11a and 11b formed on the inner peripheral surface of the outer ring 6b may be performed prior to internally securing the outer ring 6b to the liner 29. Since it is not necessary to set a knuckle 3b, which is large and complex in shape, into processing equipment to perform finishing-process of the respective outer ring raceways 11a and 11b, it realizes a structure enabling a reduction in the total weight and the number of assembling steps, of the knuckle and the wheel bearing unit, thereby reducing the total manufacturing cost.

4 Claims, 6 Drawing Sheets

Fig. 6

WHEEL ROTATION SUPPORTING APPARATUS

FIELD OF THE INVENTION

The present invention relates to an improvement in a wheel rotation supporting apparatus which rotatably supports a wheel on a knuckle constituting a vehicle (automobile) suspension system.

BACKGROUND OF THE INVENTION

Figure 5:
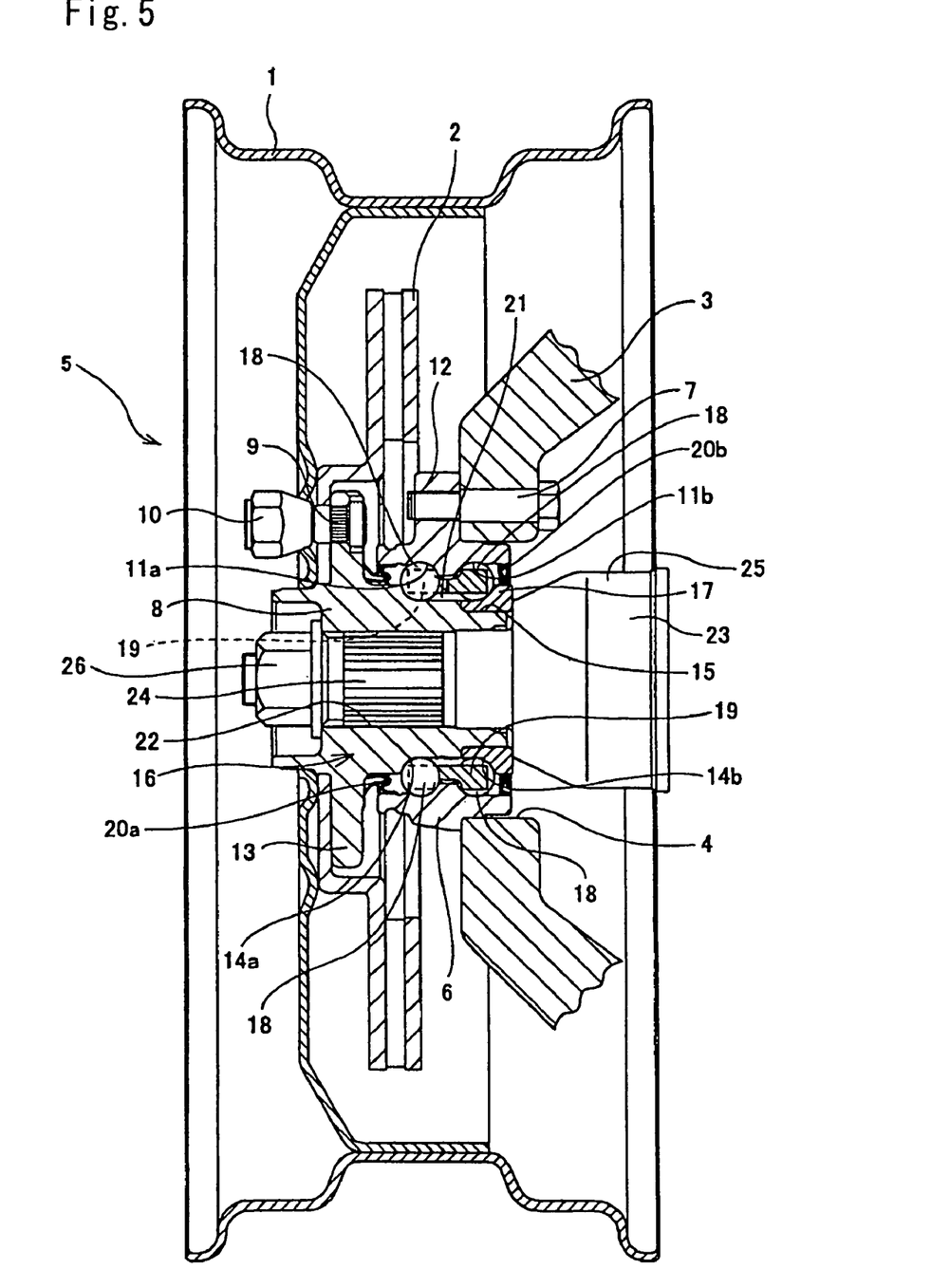
FIG. 5 is a cross-sectional view showing a first example of a conventional structure.

A wheel 1 constituting a vehicle wheel, and a rotor 2 constituting a disc brake being a braking device, are rotatably supported on a knuckle 3 constituting a suspension system, for example by the structure shown in FIG. 5. That is, an outer ring 6 being a stationary ring constituting a wheel bearing unit 5 is fixed to a portion of a circular supporting hole 4 formed on the knuckle 3, by a plurality of bolts 7. On the other hand, the wheel 1 and the rotor 2 are securely connected to a hub body 8 constituting the wheel bearing unit 5, by a plurality of studs 9 and nuts 10.

Double row outer raceways 11a and 11b are formed on the inner peripheral surface of the outer ring 6, and a fixing side flange 12 is formed on the outer peripheral surface. Such an outer ring 6 is secured to the knuckle 3 by connecting the fixed side flange 12 to the knuckle 3 by the bolts 7.

On the other hand, a rotation side flange 13 is formed on a part of the outer peripheral surface of the hub body 8, on a portion protruded beyond the outside end opening of the outer ring 6 (outside in the axial direction means the side towards the widthwise outside when assembled in the vehicle; the left side in the respective drawings, while conversely, the side towards the widthwise center when assembled in the vehicle is the inside in the axial direction; the right side in the respective drawings). The wheel 1 and the rotor 2 are firmly secured to one side face (the outside face in the illustrated example) of the rotation side flange 13 by the respective studs 9 and the nuts 10. Moreover, an inner ring raceway 14a is formed on the outer peripheral surface of a middle portion of the hub body 8, on a portion facing the outer ring raceway 11a being the axial outside raceway of the double row outer ring raceways 11a and 11b. Furthermore, an inner ring 17 constituting a hub 16 together with the hub body 8 is externally secured to a small diameter stepped portion 15 formed on the outer peripheral surface of the inside end of the hub body 8. An inner ring raceway 14b formed on the outer peripheral surface of the inner ring 17, faces the outer ring raceway 11b being the axial inside raceway of the double row outer ring raceways 11a and 11b.

A plurality of balls 18 serving as rolling elements are rotatably provided respectively between the outer ring raceways 11a and 11b, and the inner ring raceways 14a and 14b, in a state of being respectively retained by cages 19. By means of this structure, a double row angular type ball bearing, being a back-to-back duplex bearing is constituted, and the hub 16 is rotatably supported inner side of the outer ring 6, while freely supporting radial load and thrust load. Seal rings 20a and 20b are respectively provided between the inner peripheral surfaces of the opposite ends of the outer ring 6 and the outer peripheral surface of the middle portion of the hub body 8, and the outer peripheral surface of the inside end of the inner ring 17. Therefore, an interior space 21 in which the respective balls 18 are provided, is closed off from the outside.

Furthermore, since the illustrated example is a wheel bearing unit 5 for supporting a driven wheel (rear wheels of front-engine rear-drive vehicle and rear-engine rear-drive vehicle, front wheels of front-engine front-drive vehicle, and all wheels of 4-wheel-drive vehicle), a spline hole 22 is formed in the center of the hub body 8. In use, a spline shaft 24 of a constant velocity joint 23 is inserted into the spline hole 22. The inner diameter side of the rotor 2 is connected to and supported on the outside face of the rotation side flange 13 provided on the outer peripheral surface of the hub body 8. When assembled in the vehicle, in a state where the spline shaft 24 of the constant velocity joint 23 is inserted into the spline hole 22, and the outside end face of a housing 25 constituting the constant velocity joint 23 comes up against the inside end face of the inner ring 17, a nut 26 is screwed onto a tip of the spline shaft 24, on a portion protruded beyond the outside end face of the hub body 8, and secured thereto. According to this structure, the inner ring 17 is kept from being displaced in the axial direction with respect to the hub body 8.

Figure 6:
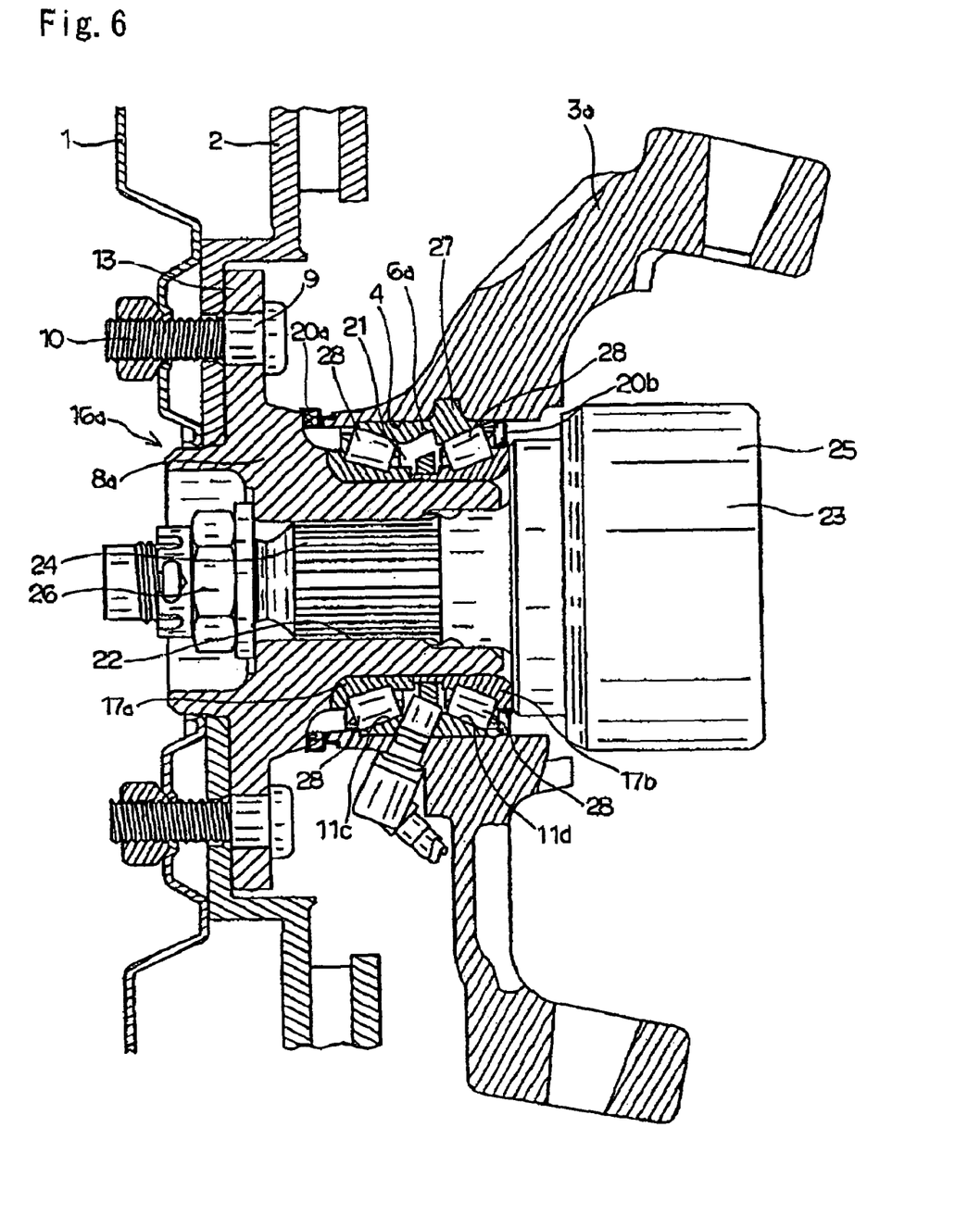
FIG. 6 is a cross-sectional view showing a second example of a conventional structure.

In the structure in the first example described above, the knuckle 3 and the outer ring 6 constituting the wheel bearing unit 5, which are constructed independently to each other, are securely connected by the plurality of bolts 7. On the other hand, in U.S. Pat. No. 6,485,188, Japanese Laid-open Patent Publication No. 2001-1709 and Japanese Laid-open Patent Publication No. 2002-46409, a structure is described where the knuckle and the outer ring of the wheel bearing unit are integrated, so as to omit the fixed side flange and the plurality of bolts for connecting the knuckle and the outer ring. FIG. 6 shows a structure described in U.S. Pat. No. 6,485,188.

In the case of the second example of a conventional structure shown in FIG. 6, an outer ring 6a having a convex portion 27 on the outer peripheral surface, is inserted into a knuckle 3a when casting the knuckle 3a, so that the outer ring 6a and the knuckle 3a are integrally constituted. Moreover, on the inner diameter side of the outer ring 6a, a hub 16a comprising a hub body 8a and a pair of inner rings 17a and 17b, is rotatably supported by a plurality of tapered rollers 28 being rolling elements.

Furthermore, in Japanese Laid-open Patent Publication No. 2001-1709 and Japanese Laid-open Patent Publication No. 2002-46409, although not shown, a structure is described where double row outer ring raceways are formed directly on the inner peripheral surface of a circular supporting hole which is formed in the knuckle, or alternatively an outer ring is secured to the knuckle by welding, so as to have the knuckle and the outer ring integrated.

According to such structures described in U.S. Pat. No. 6,485,188, Japanese Laid-open Patent Publication No. 2001-1709 and Japanese Laid-open Patent Publication No. 2002-46409, the total weight of the knuckle and the wheel bearing unit can be reduced, so that the running performance, mainly of riding comfort and running stability can be increased. Moreover, the number of assembling steps is decreased, allowing cost reduction.

In the structure described in U.S. Pat. No. 6,485,188, Japanese Laid-open Patent Publication No. 2001-1709 and Japanese Laid-open Patent Publication No. 2002-46409, while the cost can be reduced due to the reduction in the number of assembling steps, the fabrication of the outer ring raceway becomes troublesome and the manufacturing cost of the outer sing raceway is increased, so that it is difficult to reduce the cost sufficiently. The reason is as follows.

Firstly, in the conventional structure shown in FIG. 6, because of the heat applied to the outer ring 6a when casting the outer ring 6a in the knuckle 3a, the shape of the double row outer ring raceways 11c and 11d formed on the inner peripheral surface of the outer ring 6a is inevitably distorted. Therefore, after casting the outer ring 6a in the knuckle 3a, it is necessary to perform finishing process of the outer ring raceways 11c and 11d. This finishing process must be performed in a condition where the outer ring 6a which is integrated into the knuckle 3a, is set in the processing equipment for turning process. Since the knuckle 3a is much larger than the outer ring 6a and has a complex shape, the processing equipment becomes larger, and assembling of the knuckle 3a onto this processing equipment becomes troublesome. As a result, the cost for finishing process of the outer ring raceways 11c and 11d is increased and the cost reduction effect as a whole is not achieved.

As described in Japanese Laid-open Patent Publication No. 2001-1709 and Japanese Laid-open Patent Publication No. 2002-46409, the structure where the double row outer ring raceways are directly formed on the knuckle, or alternatively the outer ring is fixed to the knuckle by welding, causes problems similar to those of the conventional structure described in U.S. Pat. No. 6,485,188.

SUMMARY OF THE INVENTION

The present invention takes the above problems into consideration with an object of realizing a structure that facilitates the finishing process of the double row outer ring raceway on the inner peripheral surface of the outer ring, and that enables a reduction in the weight and the number of assembling steps in the combination of the knuckle and the wheel bearing unit.

The wheel rotation supporting apparatus of the present invention comprises; a knuckle, an outer ring, a double row outer ring raceway, a hub, a double row inner ring raceway, and a plurality of rolling elements.

The knuckle is made of a light alloy such as an aluminum alloy, a magnesium alloy, and the like, and has a supporting hole.

The outer ring is supported by and secured to the knuckle in a state where it is internally fitted to the supporting hole.

The outer ring raceways are provided on the inner peripheral surface of the outer ring.

The hub has a flange on the axial outside end for supporting and securing a wheel, and an axial inside end portion up to the axial middle portion is inserted into the inner diameter side of the outer ring.

Both the inner ring raceways are provided on the outer peripheral surface of the hub.

The plurality of rolling elements are rotatably provided respectively between the inner ring raceways and the outer ring raceways.

Particularly, in the wheel rotation supporting apparatus of the present invention, an inner peripheral surface of the supporting hole of the knuckle is an inner peripheral surface of a cylindrical liner made from steel, which is inserted (cast-embedded) when casting the knuckle.

Preferably, in a state where the outer ring is internally fitted to the liner, the outer ring is kept from axial displacement with respect to the liner by a snap ring latched into the inner peripheral surface of the liner.

In the case of the wheel rotation supporting apparatus of the present invention constituted in the above manner, all that need be done when casting the knuckle is to insert the liner. The shape accuracy required for the inner peripheral surface of the liner is not as strict as the shape accuracy required for the outer ring raceways. Therefore, normally it is not necessary to apply finishing process to the inner peripheral surface of the liner after casting the knuckle. Even if it is necessary, since it can be managed by as easy an operation as boring or sizing by passing through a hard round ball into the liner hole, large processing equipment such as for turning or grinding process which require the whole knuckle to be rotated is not necessary. Moreover, the finishing process of the double row outer ring raceways formed on the inner peripheral surface of the outer ring can be performed prior to internally securing the outer ring in the liner. Since this outer ring is small in size and has a simple shape, the finishing process of the outer ring raceways can be performed easily without using particularly large-sized processing equipment.

DETAILED DESCRIPTION OF THE INVENTION

Figure 1:
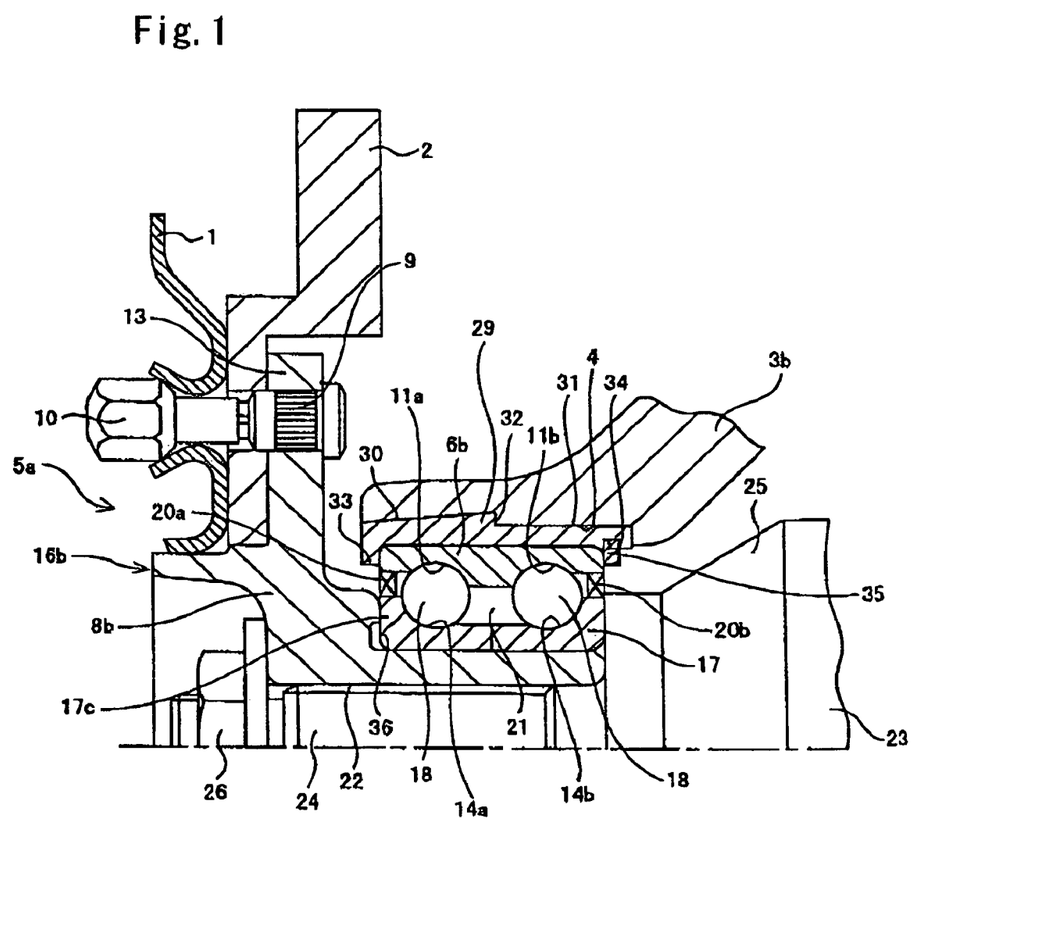
FIG. 1 is a half cross-sectional view showing a first example of an embodiment of the present invention.

FIG. 1 shows a first example of an embodiment of the present invention. A wheel rotation supporting apparatus of the present invention comprises; a knuckle 3b, a liner 29, an outer ring 6b, double row outer ring raceways 11a and 11b, a hub 16b, double row inner ring raceways 14a and 14b, and a plurality of balls 18 being rolling elements.

The knuckle 3b is made by casting (including die casting) a light alloy such as an aluminum alloy, a magnesium alloy, and the like, and has a circular supporting hole 4.

The liner 29 is formed into a cylindrical shape by forging a material such as a carbon steel, a stainless steel, and the like, and is secured within the supporting hole 4 while being kept from being displaced in the rotation direction and the axial direction. Therefore, in the present example, the shape of the generatrix of the outer peripheral surface of the liner 29 is nonlinear. That is, the axial outside half portion of the outer peripheral surface of the liner 29 is made as an inclined surface 30 which is inclined in the direction of decreasing outer diameter towards the axial outside end face, and the axial inside half portion is made as a cylindrical surface 31 which has a smaller diameter than that of the end on the large diameter side of the inclined surface 30, and has a constant outer diameter along the axial direction, and the cylindrical surface 31 and the inclined surface 30 are continued by a step 32. Moreover, although not shown, the shape in relation to the circumferential direction of the liner 29 is noncircular. For example, a radially protruding engaging convex portion, or a radially recessed engaging concave portion, is formed on a part in a circumferential direction of the liner 29. Furthermore, an inwardly directed rib portion 33 is formed on the inner peripheral surface at the axial outside end of the liner 29, and a latching concave groove 34 is formed around the whole circumference on the inner peripheral surface at the axial inside end of the liner 29. The inner peripheral surface on the middle portion of the liner 29, between the inwardly directed rib portion 33 and the latching concave groove 34, has a cylindrical surface for which the inner diameter thereof does not change in relation to the radial direction.

The liner 29 described above is inserted (cast-embedded) into the supporting hole 4 when casting the knuckle 3b. Therefore, the inner peripheral surface of the supporting hole 4 of the knuckle 3b is constituted by the inner peripheral surface of the liner 29. The liner 29 inserted into the supporting hole 4 of the knuckle 3b in this manner is firmly fixed to the knuckle 3b while being kept from axial displacement and rotation.

The outer ring 6b is internally secured to inner diameter side of the liner 29 which is secured to the supporting hole 4 of the knuckle 3b in the above manner. Therefore, in the case of the present example, the outer diameter of the outer ring 6b is restricted to a size to the extent that it can be internally fitted in the liner 29 with a slight interference fit. The axial dimension of the outer ring 6b is made approximately equal to the distance between the inwardly directed rib portion 33 and the latching concave groove 34. Such an outer ring 6b is pushed into the liner 29 from the inside end opening of the liner 29 so that the outside end face of the outer ring 6b and the inside face of the inwardly directed rib portion 33 abut against each other. In this state, the latching concave groove 34 is exposed axially inward beyond the inside end face of the outer ring 6b. Therefore, the snap ring 35 is latched in the latching concave groove 34.

The snap ring 35 is formed from an elastic and corrosion resistant metal plate such as a stainless spring steel, into a segmental annular shape (C shape), so that the outer diameter can be elastically contracted. Such a snap ring 35 is pushed into the liner 29 while elastically contracting the outer diameter, and the outer diameter side half portion thereof is latched into the latching concave groove 34. In this state, the inner diameter side half portion of the snap ring 35 is protruded radially inward from the inner peripheral surface of the liner 29, and comes in a contact with or closely faces the inside end face of the outer ring 6b. As a result, the outer ring 6b is held by the axial opposite ends of the inwardly directed rib portion 33 and the snap ring 35, so that it can be kept from axial displacement with respect to the liner 29 and kept from coming out of the supporting hole 4. While the vehicle is travelling in a turn, a large thrust load is loaded onto the hub 16b, and this thrust load is supported by the inwardly directed rib portion 33 having a small area, or the latching concave groove 34 having also a small area in which the snap ring 35 is latched. In the case of the present example, the inwardly directed rib portion 33 and the latching concave groove 34 are both formed on the liner 29 which is made from a steel having sufficient strength, and the liner 29 is inserted into the knuckle 3b. Therefore, even if the knuckle 3b is made from a light alloy, a structure with sufficient endurance against the thrust load can be obtained.

The outer ring raceways 11a and 11b are provided on the inner peripheral surface of the outer ring 6b internally fixed to the inner diameter side of the liner 29 which is secured to the supporting hole 4 of the knuckle 3b in the abovementioned manner.

Moreover, the hub 16b has a rotation side flange 13 on the axial outside end for supporting and securing the wheel, and the axial middle portion up to the axial inside end portion is inserted into the inner diameter side of the outer ring 6b. In the present example, the hub 16b comprises a pair of inner rings 17c and 17 externally fitted to the axial middle portion up to the axial inside end portion of the hub body 8b. When the wheel rotation supporting apparatus is assembled, these inner rings 17c and 17 are held between a step portion 36 formed on the axial middle portion of the hub body 8b, and the outside end face of the housing 25 of the constant velocity joint 23 connected to the hub body 8b.

Moreover, the inner ring raceways 14a and 14b are respectively provided on the outer peripheral surface of the inner rings 17c and 17 constituting the hub 16b. Furthermore, the plurality of balls 18 are rotatably provided respectively between the inner ring raceways 14a and 14b, and the outer ring raceways 11a and 11b.

According to the above structure, the hub 16b is rotatably supported on the inner diameter side of the supporting hole 4 of the knuckle 3b via the liner 29, the outer ring 6b, and the respective balls 18.

In the wheel rotation supporting apparatus of the present example constituted in the abovementioned manner, all that need be done when casting the knuckle 3b is to insert the liner 29. There is no need for inserting the outer ring into or welding the outer ring to the knuckle as in the conventional technology. The inner peripheral surface of the liner 29 need only be such that the outer ring 6b can be internally fitted therein without any looseness, and the required shape accuracy is not as strict as the shape accuracy required for the outer ring raceways 11a and 11b. Therefore, normally, it is not necessary to apply finishing process to the inner peripheral surface of the liner 29 which is inserted into the supporting hole 4, after casting the knuckle 3b.

Moreover, the finishing process of the respective outer ring raceways 11a and 11b formed on the inner peripheral surface of the outer ring 6b can be performed prior to internally securing the outer ring 6b in the liner 29. Since this outer ring 6b itself is small in size and has a simple shape, the finishing of the respective outer ring raceways 11a and 11b can be performed easily without using particularly large processing equipment. Also, distortion of the outer ring raceways 11a and 11b accompanying internally fixing the outer ring 6b to the liner 29, does not exist or is a negligibly small if any. Therefore, after internally fixing the outer ring 6b to the liner 29, an operation for correcting the shape of the outer ring raceways 11a and 11b is not necessary.

As a result it is possible to realize a structure enabling a reduction in the total weight and the number of assembling steps, of the knuckle 3b and the wheel bearing unit 5a, while reducing the cost.

Figure 2:
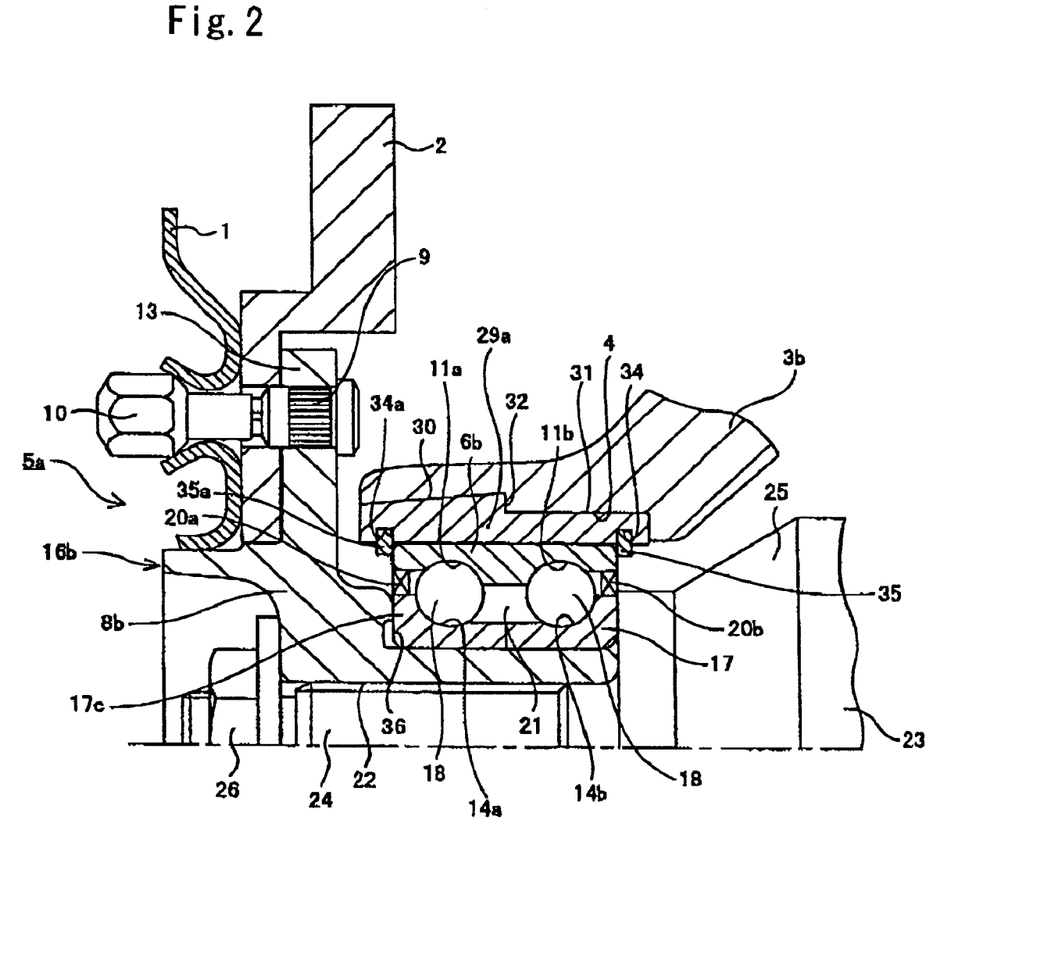
FIG. 2 is a half cross-sectional view showing a second example of the embodiment of the present invention.

FIG. 2 shows a second example of the embodiment of the present invention. In the present example, a latching concave groove 34a is formed in the inner peripheral surface of the axial outside end of the liner 29a, as well as in the inner peripheral surface of the axial inside end thereof, Moreover, by a pair of snap rings 35 and 35a respectively latched in the latching concave grooves 34 and 34a which are formed in the inner peripheral surface of the axial opposite ends of the liner 29a, the outer ring 6b is held from the axial opposite ends, and the outer ring 6b is kept from coming out of the liner 29a. The construction and operation of the other components are the same as for the first example mentioned above, and hence the same reference symbols are used for the same or equivalent components, and repeated description is omitted.

Figure 3:
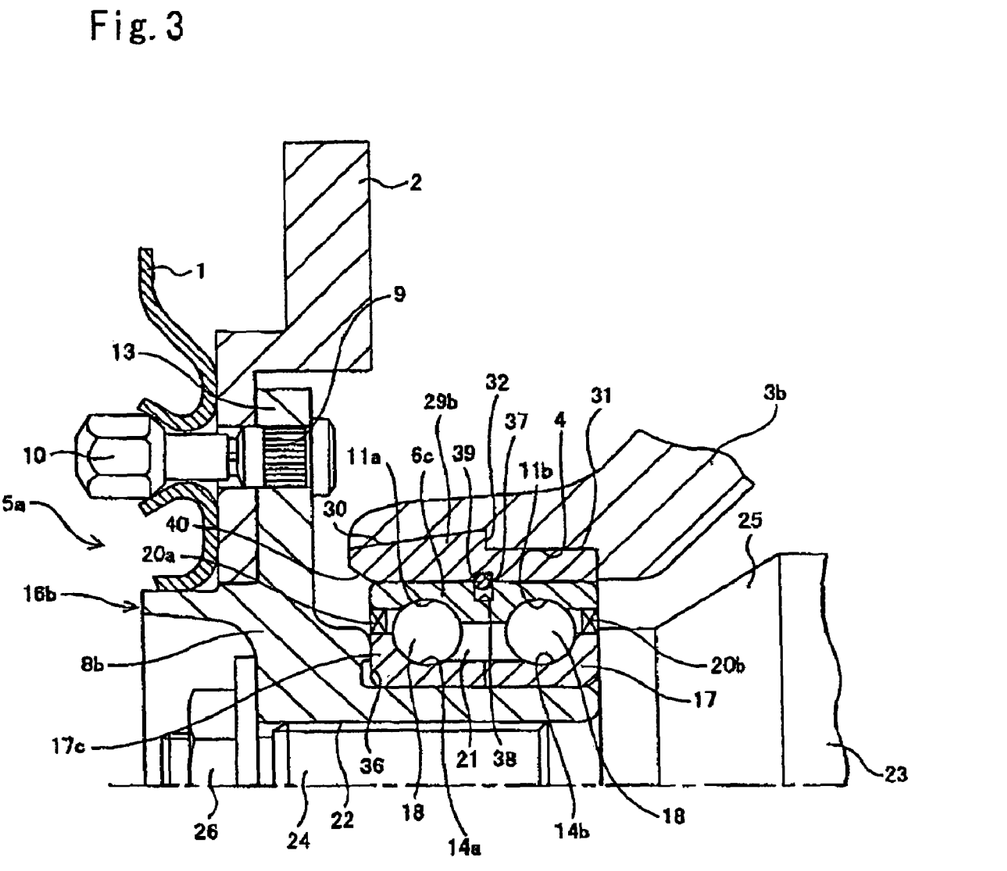
FIG. 3 is a half cross-sectional view showing a third example of the embodiment of the present invention.

FIG. 3 shows a third example of the embodiment of the present invention. In the present example a snap ring 39 is spanned between an outer diameter side latching concave groove 37 formed in the inner peripheral surface of the axial middle portion of the liner 29b, and an inner diameter side latching concave groove 38 formed in the outer peripheral surface of the axial middle portion of the outer ring 6c, to thereby keep the outer ring 6c from coming out of the liner 29b. In the present example, the snap ring 39 is formed into a segmented annular shape (C shape) by bending a circular cross-section wire rod into a ring, and has elasticity in the direction to increase the outer diameter. Moreover, the depth of the outer diameter side latching concave groove 37 is made smaller than the cross-sectional diameter of the wire rod constituting the snap ring 39, preferably half the diameter. On the other hand, the depth of the inner diameter side latching concave groove 38 is larger than the cross-sectional diameter of the wire rod. The thickness at the axial middle portion of the outer ring 6c, at the portion where the inner diameter side latching concave groove 38 is formed, is sufficiently large. Therefore, a situation where the strength of the outer ring 6c is insufficient due to forming the inner diameter side latching concave groove 38, does not arise. In other words, the inner diameter side latching concave groove 38 is formed in the axial middle portion which can be ensured to have sufficient strength. Moreover, a cone-shaped guiding inclined surface 40 is formed on the axial outside end opening of the liner 29b. The angle of inclination with respect to the central axis of the generatrix of this guiding inclined surface 40 is set in terms of design, and for example is around 20 to 30 degrees.

In order to assemble the abovementioned structure of the present example, in the case where the outer ring 6c is secured to the inner diameter side of the liner 29b, firstly the snap ring 39 is latched in the inner diameter side latching concave groove 38. In this state, the snap ring 39 tends to come out from the inner diameter side latching concave groove 38. Accordingly, while keeping it from coming out, the outer ring 6c is pushed from the outside end opening side of the liner 29b into the liner 29b. As a result, the snap ring 39 is inserted into the liner 29b while being elastically contracted by the guiding inclined surface 40. Then, in a condition with the snap ring 39 matched with the outer diameter side latching concave groove 37, the diameter of the snap ring 39 is elastically expanded and as shown in FIG. 3, the snap ring 39 is spanned between the outer diameter side latching concave groove 37 and the inner diameter side latching concave groove 38. Such a construction of the present example provides excellent workability for assembling the outer ring 6c to the liner 29b, thus reducing assembling cost. The construction and operation of the other components are the same as for the first example mentioned above, and hence the same reference symbols are used for the same or equivalent components, and repeated description is omitted.

Since the snap ring 39 consisting of the circular cross-sectional wire rod bent into a ring, slides smoothly on the guiding inclined surface 40, the assembling operation becomes easier compared to with the cross-sectional rectangular snap ring which is obtained by punch forming a metal plate. However, the contact portions of the snap ring 39 with the outer diameter side latching concave groove 37 and with the inner diameter side latching concave groove 38 become line contact, and in the case where a thrust load is applied on the hub 16b, accompanying driving in a turn, a large contact stress acts on the respective contact portions. To address this, in the case of the present example, since the outer diameter side latching concave groove 37 is formed in the liner 29b made from a steel, and the inner diameter side latching concave groove 38 is formed in the outer ring 6c made from bearing steel, deformation of the respective contact portions can be suppressed. Moreover, even if the knuckle 3b is made from a light alloy, a structure with sufficient endurance against the thrust load can be obtained.

Figure 4:
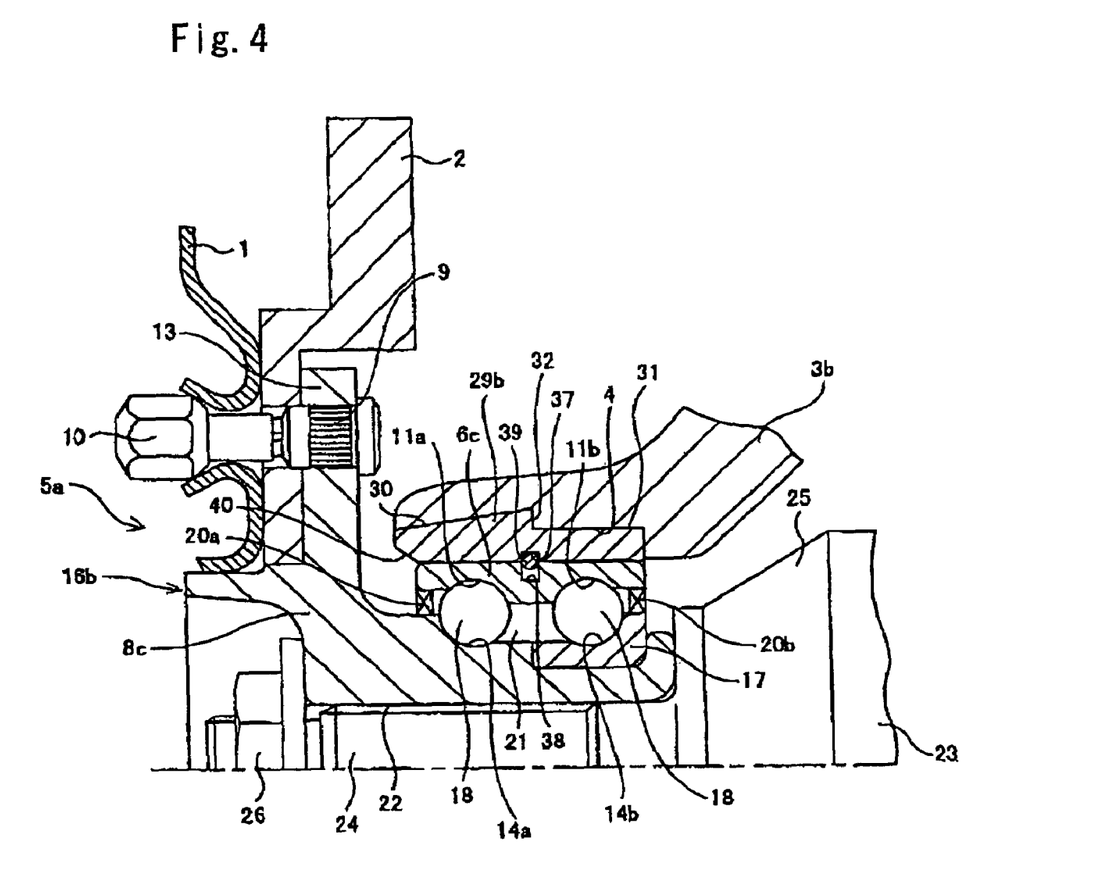
FIG. 4 is a half cross-sectional view showing a fourth example of the embodiment of the present invention.

FIG. 4 shows a fourth example of the embodiment of the present invention. In the present example, the inner ring raceway 14a of the pair of inner ring raceways 14a and 14b, which is on the axial outside, is formed directly on the outer peripheral surface of the axial middle portion of the hub body 8c, similarly to the case of the aforementioned first example of the conventional structure shown in FIG. 5. The construction and operation of the other components are the same as for the third example mentioned above, and hence the same reference symbols are used for the same or equivalent components, and repeated description is omitted.

Additionally in order to prevent a galvanic corrosion between the light alloy material of the knuckle and the steel liner, it is preferable to coat the surface of the liner by electrically insulating material before inserting the liner into the knuckle.

Since the present invention is constructed and operated as described above, it is possible to realize a wheel rotation supporting apparatus which can reduce the total weight and the number of assembling steps of the knuckle and the wheel bearing unit at low cost, thus contributing to the vehicle running performance and improvement in the fuel consumption.

The invention claimed is:

1. A wheel rotation supporting apparatus comprising;
   a knuckle made of a light alloy and having a supporting hole;
   an outer ring supported by and secured to the knuckle in a state where it is internally fitted to the supporting hole;
   a double row outer ring raceway provided on the inner peripheral surface of the outer ring;
   a hub having a flange on the axial outside end for supporting and securing a wheel, with the axial middle portion up to an axial inside end portion which is inserted into the inner diameter side of the outer ring;
   a double row inner ring raceway provided on the outer peripheral surface of the hub; and
   a plurality of rolling elements rotatably provided respectively between the inner ring raceways and the outer ring raceways,
   wherein an inner peripheral surface of the supporting hole of the knuckle is an inner peripheral surface of a cylindrical liner made from steel, which is inserted when casting the knuckle,
   the outer ring is internally fitted to the liner, and
   wherein the shape of the generatrix of the outer peripheral surface of the liner is nonlinear, and the shape in relation to the circumferential direction is noncircular, so that the liner is secured to the knuckle while being kept from axial displacement and rotation in relation thereto.

2. A wheel rotation supporting apparatus comprising;
   a knuckle made of a light alloy and having a supporting hole;
   an outer ring supported by and secured to the knuckle in a state where it is internally fitted to the supporting hole;
   a double row outer ring raceway provided on the inner peripheral surface of the outer ring;
   a hub having a flange on the axial outside end for supporting and securing a wheel, with the axial middle portion up to an axial inside end portion which is inserted into the inner diameter side of the outer ring;
   a double row inner ring raceway provided on the outer peripheral surface of the hub; and
   a plurality of rolling elements rotatably provided respectively between the inner ring raceways and the outer ring raceways, wherein an inner peripheral surface of the supporting hole of the knuckle is an inner peripheral surface of a cylindrical liner made from steel, which is inserted when casting the knuckle, the outer ring is internally fitted to the liner; and wherein the outer ring is held from axially opposite ends by an inwardly directed rib portion formed on one axial end of the liner, and a snap ring latched into an inner peripheral surface of the other axial end of the liner.

3. A wheel rotation supporting apparatus comprising;

a knuckle made of a light alloy and having a supporting hole;

an outer ring supported by and secured to the knuckle in a state where it is internally fitted to the supporting hole;

a double row outer ring raceway provided on the inner peripheral surface of the outer ring;

a hub having a flange on the axial outside end for supporting and securing a wheel, with the axial middle portion up to an axial inside end portion which is inserted into the inner diameter side of the outer ring;

a double row inner ring raceway provided on the outer peripheral surface of the hub; and a plurality of rolling elements rotatably provided respectively between the inner ring raceways and the outer ring raceways, wherein an inner peripheral surface of the supporting hole of the knuckle is an inner peripheral surface of a cylindrical liner made from steel, which is inserted when casting the knuckle, the outer ring is internally fitted to the liner, and wherein the outer ring is held from axially opposite ends by a pair of snap rings, each of the snap ring being latched into the inner peripheral surface on axially opposite ends of the liner.

4. A wheel rotation supporting apparatus comprising;

a knuckle made of a light alloy and having a supporting hole;

an outer ring supported by and secured to the knuckle in a state where it is internally fitted to the supporting hole;

a double row outer ring raceway provided on the inner peripheral surface of the outer ring;

a hub having a flange on the axial outside end for supporting and securing a wheel, with the axial middle portion up to an axial inside end portion which is inserted into the inner diameter side of the outer ring;

a double row inner ring raceway provided on the outer peripheral surface of the hub; and a plurality of rolling elements rotatably provided respectively between the inner ring raceways and the outer ring raceways, wherein an inner peripheral surface of the supporting hole of the knuckle is an inner peripheral surface of a cylindrical liner made from steel, which is inserted when casting the knuckle, the outer ring is internally fitted to the liner, and wherein a snap ring is spanned between an outer diameter side latching concave groove formed in the inner peripheral surface of an axial middle portion of the liner, and an inner diameter side latching concave groove formed in the outer peripheral surface of an axial middle portion of the outer ring.

* * * * *